US012660767B1

(12) United States Patent
Phelps et al.

(10) Patent No.: US 12,660,767 B1
(45) Date of Patent: Jun. 23, 2026

(54) NO-TILL PLANTER

(71) Applicants: Jesse Allen Phelps, Lima, NY (US);
Joshua Allen Phelps, Lima, NY (US);
Helen Alberta Phelps, Lima, NY (US)

(72) Inventors: Jesse Allen Phelps, Lima, NY (US);
Joshua Allen Phelps, Lima, NY (US);
Helen Alberta Phelps, Lima, NY (US)

( * ) Notice: Subject to any disclaimer, the term of this
patent is extended or adjusted under 35
U.S.C. 154(b) by 0 days.

(21) Appl. No.: 19/245,295

(22) Filed: Jun. 21, 2025

(51) Int. Cl.
*A01G 13/31* (2025.01)
*A01G 13/10* (2006.01)

(52) U.S. Cl.
CPC ............. *A01G 13/31* (2025.01); *A01G 13/10*
(2013.01)

(58) Field of Classification Search
CPC ............................................. A01G 13/10–105
See application file for complete search history.

(56) References Cited

U.S. PATENT DOCUMENTS

| | | | | |
|---|---|---|---|---|
| 135,173 | A | * | 1/1873 | Timby .................... A01G 13/28 |
| | | | | 47/21.1 |
| 3,287,851 | A | * | 11/1966 | Cramer .................. A01G 13/31 |
| | | | | 47/32 |
| 3,803,759 | A | | 4/1974 | Heinecke |
| 3,896,586 | A | * | 7/1975 | Caldwell ................ A01G 13/26 |
| | | | | 47/32.7 |
| 4,268,992 | A | * | 5/1981 | Scharf, Sr. ............. A01G 13/28 |
| | | | | 47/21.1 |

| | | | | |
|---|---|---|---|---|
| 4,286,408 | A | * | 9/1981 | Manno .................... A01G 13/26 |
| | | | | 47/21.1 |
| 4,348,831 | A | * | 9/1982 | Chambers .............. A01G 13/27 |
| | | | | 47/24.1 |
| 4,648,203 | A | | 3/1987 | Worzek |
| 4,700,507 | A | * | 10/1987 | Allen ..................... A01G 13/27 |
| | | | | 47/32.4 |
| 4,858,378 | A | * | 8/1989 | Helmy .................. A01G 13/31 |
| | | | | 47/33 |
| 4,986,025 | A | | 1/1991 | Imperial |
| 5,323,557 | A | | 6/1994 | Sonntag |
| 5,355,623 | A | * | 10/1994 | Brown ................... A01G 13/31 |
| | | | | 47/84 |
| 5,528,855 | A | * | 6/1996 | Kapphahn .............. A01G 13/31 |
| | | | | 47/32 |
| 5,528,858 | A | * | 6/1996 | Omdahl ................ A01M 29/30 |
| | | | | 47/33 |

(Continued)

FOREIGN PATENT DOCUMENTS

| | | | | | |
|---|---|---|---|---|---|
| DE | | 3604321 | C1 | * | 2/1987 ........... A01G 13/105 |
| DE | | 10043642 | A1 | * | 3/2002 ........... A01G 13/105 |

(Continued)

*Primary Examiner* — Morgan T Jordan
(74) *Attorney, Agent, or Firm* — Simpson & Simpson,
PLLC

(57) ABSTRACT

A planter for surrounding the base of one or more plants
rooted in the ground, the planter including a rectangular
cover including a periphery and an opening through which
the one or more plants is disposed; a trough disposed at a
first offset from the periphery, wherein the trough is con-
figured for receiving a pest repellent; and a band of micro
spikes disposed at a second offset from the periphery,
wherein the second offset is larger than the first offset and the
band of micro spikes is configured to cooperate with the pest
repellent to reduce ground intrusion of pests from the
periphery to the opening.

13 Claims, 14 Drawing Sheets

(56) References Cited

U.S. PATENT DOCUMENTS

| | | | | |
|---|---|---|---|---|
| 5,709,049 | A * | 1/1998 | Baird | B29B 17/0042 |
| | | | | 47/21.1 |
| 5,711,106 | A * | 1/1998 | Ellis | A01G 9/28 |
| | | | | 47/30 |
| 5,794,378 | A * | 8/1998 | Beatrez | A01G 13/31 |
| | | | | 47/32 |
| 5,839,222 | A * | 11/1998 | Sittner | A01G 7/06 |
| | | | | 47/21.1 |
| 5,918,411 | A * | 7/1999 | Hadrava | A01G 13/31 |
| | | | | 47/21.1 |
| 6,038,810 | A * | 3/2000 | Kocsis, Jr. | A01G 13/28 |
| | | | | 47/29.2 |
| 6,061,952 | A * | 5/2000 | Palmer | A01G 13/31 |
| | | | | 47/21.1 |
| 6,536,158 | B2 * | 3/2003 | Rice | A01G 13/31 |
| | | | | 47/32.4 |
| 6,976,334 | B1 * | 12/2005 | Bowditch | A01G 13/10 |
| | | | | 47/29.1 |
| 7,784,217 | B2 * | 8/2010 | San Solo | A01G 25/06 |
| | | | | 47/33 |
| 8,006,433 | B1 * | 8/2011 | Bryanton | A01G 9/12 |
| | | | | 47/45 |
| 8,365,465 | B2 * | 2/2013 | Ogilvie | A01G 13/31 |
| | | | | 47/21.1 |
| 8,381,436 | B2 * | 2/2013 | Harley | A01G 25/00 |
| | | | | 47/33 |
| 8,826,588 | B1 * | 9/2014 | MacKichan | A01G 9/124 |
| | | | | 47/33 |
| 10,561,074 | B2 | 2/2020 | Emory | |
| D878,242 | S * | 3/2020 | Gallo | D11/155 |
| 10,631,470 | B2 * | 4/2020 | Parker | A01G 13/31 |
| 2002/0124463 | A1 * | 9/2002 | Venable | A01G 13/31 |
| | | | | 47/9 |
| 2003/0150157 | A1 * | 8/2003 | Carkner | A01G 13/32 |
| | | | | 47/33 |
| 2005/0081426 | A1 * | 4/2005 | Hsia | A01G 13/105 |
| | | | | 43/124 |
| 2009/0172999 | A1 * | 7/2009 | Thorne | A01G 13/20 |
| | | | | 47/22.1 |
| 2011/0154732 | A1 * | 6/2011 | Shields | A01M 29/30 |
| | | | | 43/107 |
| 2011/0214338 | A1 * | 9/2011 | Neumann | E04B 1/72 |
| | | | | 43/77 |
| 2014/0223805 | A1 * | 8/2014 | Chilton | A01M 29/30 |
| | | | | 43/131 |
| 2016/0286786 | A1 * | 10/2016 | Miller | A01M 29/34 |
| 2016/0374274 | A1 * | 12/2016 | Johnson | A01G 13/105 |
| | | | | 47/65.5 |
| 2019/0104691 | A1 * | 4/2019 | Momcilovich | A01G 13/31 |

FOREIGN PATENT DOCUMENTS

| | | | | |
|---|---|---|---|---|
| DE | 202011107175 U1 * | 1/2012 | | A01G 13/105 |
| DE | 202014007199 U1 * | 11/2014 | | A01G 13/10 |
| EP | 2347646 | 7/2011 | | |
| FR | 3024325 | 2/2016 | | |
| WO | WO-2015135062 A1 * | 9/2015 | | A01G 13/31 |
| WO | WO-2016135533 A1 * | 9/2016 | | A01G 13/105 |
| WO | 2021122824 | 6/2021 | | |
| WO | WO-2021122824 A1 * | 6/2021 | | A01G 13/105 |

* cited by examiner

NO-TILL PLANTER

BACKGROUND OF THE INVENTION

1. The Field of the Invention

The present invention relates to protective gardening equipment. More specifically, the present invention is directed to a no-till planter configured to surround and protect plants from pests and environmental stress during early growth phases.

2. Background Art

Conventional garden planters and plant covers provide limited protection against pests such as crawling insects, slugs, or rodents. Many solutions require toxic pesticides or elaborate fencing systems, which are not always desirable in residential or environmentally sensitive contexts. Additionally, young seedlings are particularly vulnerable to environmental factors such as wind, cold, and dehydration. A need exists for a modular, pest-deterrent, and moisture-regulating planter system that can be easily deployed around plants at various stages of growth.

U.S. Pat. No. 5,323,557 to Sonntag (Hereinafter Sonntag) discloses a landscaping mat for surrounding a tree trunk and upstanding posts so as to eliminate the need to mow and trim around the tree or post. The mat includes a flexible inner portion, an intermediate portion surrounding the inner portion, and an outer portion surrounding the intermediate portion. The intermediate portion is thicker than the inner portion, and the outer portion is tapered to an outer perimeter edge. A slit extends from the perimeter edge to a central opening in the inner portion so as to allow the mat to be placed in position around a tree trunk or post. Alternatively, the slit may extend through the diameter of the mat so as to define two mirror image mat sections. Concentric scored lines are provided around the central opening and can be cut so as to increase the diameter of the opening so as to accommodate different sized tree trunks or posts. A rib may be provided on the intermediate portion for retaining ornamental materials, such as rocks, bark, wood chips or mulch. Alternatively, the upper surface of the mat may be textured and colored so as to resemble such ornamental materials. Sonntag discloses a circular mat having an outer perimeter edge which facilitates mowing although it lacks other features, e.g., sections with micro holes to mitigate runoffs, a rectangular-shaped structure which renders it possible for forming a continuous ground coverage to be formed using multiple mats, a surface portion with micro spikes, a trough for holding a pest repellent/killer, and a levee which helps create microclimate that encourages plant growth, and punch-through holes to receive trellises, etc.

U.S. patent Ser. No. 10/561,074 to Emory (Hereinafter Emory) discloses a plant skirt which provides a weed barrier system that is easy to construct and install, and virtually eliminates weed encroachment. The plant skirt includes a barrier member having a substantially flat body constructed from landscaping material and having an outer rim edge. The body includes a weighted edge perimeter, wherein the perimeter is constructed having sand therein. At least one edge area of the body has a weighted edge perimeter including an elongated slit. The elongated slit extends to and terminates at a center aperture in the flat body. The elongated slit has overlapping capable sides, and the center aperture is a small opening appointed to surround a plant's stem so that the stem is flush against the center aperture and a weed cannot easily grow between the center aperture and the stem. Emory discloses the concept of forming a continuous coverage although it lacks other features, e.g., sectioned portions with micro holes to mitigate runoffs, a surface portion with micro spikes, a trough for holding a pest repellent, and a levee which helps create a microclimate that encourages plant growth, and punch-through holes to receive trellises etc.

U.S. Pat. No. 4,986,025 to Imperial (Hereinafter Imperial) discloses an apparatus including a surrounding shield formed with a central aperture positionable about a central stalk or trunk portion of a shrub or tree growth. The apparatus includes four pie-shaped segments that are interlocked relative to one another utilizing lug members receivable within key-shaped openings of adjacent walls of the pie-shaped segments. The segments include a floor formed with a matrix of apertures therethrough. Each pie-shaped segment is defined by a perimeter wall defining a cavity with a pie-shaped container segment of complementary configuration received within a forward portion of the cavity, wherein the container segments are defined by a perimeter wall of a height greater than that defined by the pie-shaped segment walls for receiving additional plants therewithin is surrounding relationship relative to a main plant or alternatively receive fluid fertilizer and the like for treatment of the root system of an associated central plant. Additionally, pie-shaped segment inserts defining an enclosed chamber filled with a mineral oil and the like are positionable within each of the pie-shaped segment cavities for retention of heat during daylight hours and enabling dispensing of the heat during evening hours preventing premature freezing of a root system of an associated plant. Imperial discloses an apparatus including a number of segments with apertures for draining the contents of the segments although it lacks a perimeter edge which facilitates mowing, a rectangular-shaped structure which renders it possible for forming a continuous ground coverage using multiple mats, a surface portion with micro spikes, a trough for holding a pest repellent, and a levee which helps create a microclimate that encourages plant growth, punch-through holes to receive trellises, etc.

U.S. Pat. No. 4,648,203 to Worzek (Hereinafter Worzek) discloses a protector for surrounding the base of a trunk of a tree includes a base, a barrier wall and, a slit which extends, on a centerline, through the major portion of base. The central portion of base is defined by a plurality of crescent shaped flaps, each attached to the next by a hinge, on each side of the centerline. The central base structure facilitates easy installation and accommodates tree growth, while enabling the capture and gradual permeation of liquids from the reservoir, defined by the barrier wall, to the root zone. An outwardly directed flange on base serves as a mower track which can be anchored by pins through punch out holes defined on flange. Although Worzek discloses a perimeter edge which facilitates mowing, it lacks a number of sections with apertures for draining the contents of the sections, a surface portion with micro spikes, a trough for holding a pest repellent/killer, and a levee which helps create a microclimate that encourages plant growth, and punch-through holes to receive trellises, etc.

U.S. Pat. No. 3,803,759 to Heinecke (Hereinafter Heinecke) discloses a growth-promoting, protecting and supporting device for plants and particularly, for a seasonal type of plant which is to be retained in an upright position, which requires protection for starting it, or for a maximum rate of growth or yield. The device employs a pan having a plant stem by-passing central window portion, a set of rod-like pan-spacing and supporting and area-defining legs, and a substantially cone shaped enclosure that may be used as needed. The legs extend endwise through outer peripheral portions of the pan and have a position-supporting locking engagement with the pan when in an assembled, upwardly converging and downwardly diverging relation therewith. The pan is shaped to strengthen it, to position the enclosure and to collect and flow moisture through its central window portion about the stem of a plant. The legs serve as a growth area defining means for the plant and are also provided along their vertical extent with the tie means for branches of the plant. A removable apex connector secures the legs in their assembled relation. Although Heinecke discloses a device with punch-through holes, the device is not configured to lay flat on the ground, and it lacks a perimeter edge which facilitates mowing, a number of sections with apertures for draining the contents of the sections, a surface portion with micro spikes, a trough for holding a pest repellent/killer, and a levee which helps create a microclimate that encourages plant growth, etc.

European App. No. 2347646A1 of Varjus (Hereinafter Varjus) discloses a growth protector for a plant, which is formed from a plate-like material. The growth protector includes a growth opening arranged in the protector, wherein the stem of the plant can be fitted, and an installation slit, which extends from the edge of the growth opening to the outer edge of the protector. A container part has further been arranged in connection with the protector, in the bottom of which cavities have been arranged, which form the surface of the protector, which is meant to be against the ground. Although Varjus discloses a device with holes for receiving trellises, the device lacks a number of sections with apertures for draining the contents of the sections, a surface portion with micro spikes, and a trough for holding a pest repellent/killer, and it is configured in a circular shape, etc.

French Pat. No. 3024325A1 to Sariege (Hereinafter Sariege) discloses to a device for the cultivation of at least one plant adapted to be placed on a cultivation substrate, including a planting orifice adapted to allow the plant pushing through rooting into the culture substrate, including a cover lip extending around the planting orifice adapted to cover an obscured area of the culture substrate having at least one gravity flow-collecting cup portion of water toward the planting orifice. Sariege discloses a channel useful to store a liquid. However, Sariege fails to disclose a perimeter edge which facilitates mowing, a number of sections with apertures for draining the contents of the sections, a surface portion with micro spikes, a trough for holding a pest repellent, etc.

WIPO App. Pub. WO2021122824A1 of McCuaig (Hereinafter McCuaig) discloses a barrier device to protect crop against pests, such as mollusks, e.g., slugs and snails, from eating plants, flowers, fruits, vegetables and/or shrubs. In particular, there is described a range of garden pest barrier devices including protrusions and/or spikes which create a protective barrier which garden pests such as slugs and/or snails cannot traverse across or it at least makes it much more difficult for the pests to traverse. McCuaig discloses spikes/protrusions useful as barriers to the pests. However, its barrier device is not adapted to a planter having most or all of the features of the present planter.

There exists a need for a low-profile planter suitable for no-till planting practices which does not interfere with mowing carried out along one or more edges of the planter, a planter effective in preventing the intrusion of pests, e.g., slugs, and snails, etc. and a planter which does not cause flooding of the plant/s but one which allows drip irrigation of the plant/s it protects, in order to promote growth. Moreover, many planting methods require soil tilling, which can disturb the soil microbiome, increase erosion, and release stored carbon. A need further exists for planters that support no-till gardening, where seeds or seedlings can be introduced into undisturbed soil. No-till practices are increasingly valued for preserving soil structure, maintaining organic matter, reducing weed emergence, and minimizing labor.

SUMMARY OF THE INVENTION

In accordance with the present invention, there is provided a planter for surrounding the base of one or more plants rooted in the ground, the planter including:
- (a) a rectangular cover including a periphery and an opening through which the one or more plants is disposed;
- (b) a trough disposed at a first offset from the periphery, wherein the trough is configured for receiving a pest repellent; and
- (c) a band of micro spikes disposed at a second offset from the periphery, wherein the second offset is larger than the first offset and the band of micro spikes is configured to cooperate with the pest repellent to reduce ground intrusion of pests from the periphery to the opening.

In one embodiment, the planter further includes a flat plate extending from the trough to the periphery. In one embodiment, the planter further includes a plurality of sections extending from the band of micro spikes to the opening, wherein each of the plurality of sections includes a plate surrounded by walls and a plurality of weep holes disposed through the plate. In one embodiment, the planter further includes a plurality of apertures each disposed at a corner of the rectangular cover and configured to receive a pin to secure the rectangular cover to the ground. In one embodiment, the planter further includes a plurality of punch-through holes within an area of the rectangular cover surrounded by the band of micro spikes. In one embodiment, the planter further includes a tube configured to be disposed within the opening and a transparent lid configured to be disposed atop the tube. In one embodiment, the tube is formed of a flat sheet having two side edges, the flat sheet configured to be manipulatable into the shape of a cylinder by coupling the two side edges together. In one embodiment, the planter further includes a levee disposed about the opening. In one embodiment, the planter further includes a raised structure upon which the band of micro spikes is disposed, wherein the raised structure and the levee are configured to cooperate to contain moisture received in an area between the raised structure and the levee. In one embodiment, the band of micro spikes is configured to be disposed adjacent to the trough.

An object of the present invention is to offer a planter that eliminates the need for traditional tilling prior to planting.

Another object of the present invention is to provide a planter configured to resist intrusion by slugs, snails, and other terrestrial invertebrate pests.

Another object of the present invention is to provide a planter capable of collecting and storing rainwater for later gravity-fed irrigation.

Another object of the present invention is to provide a planter capable of preventing overwatering of a plant resulting from excessive rainfall or watering.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
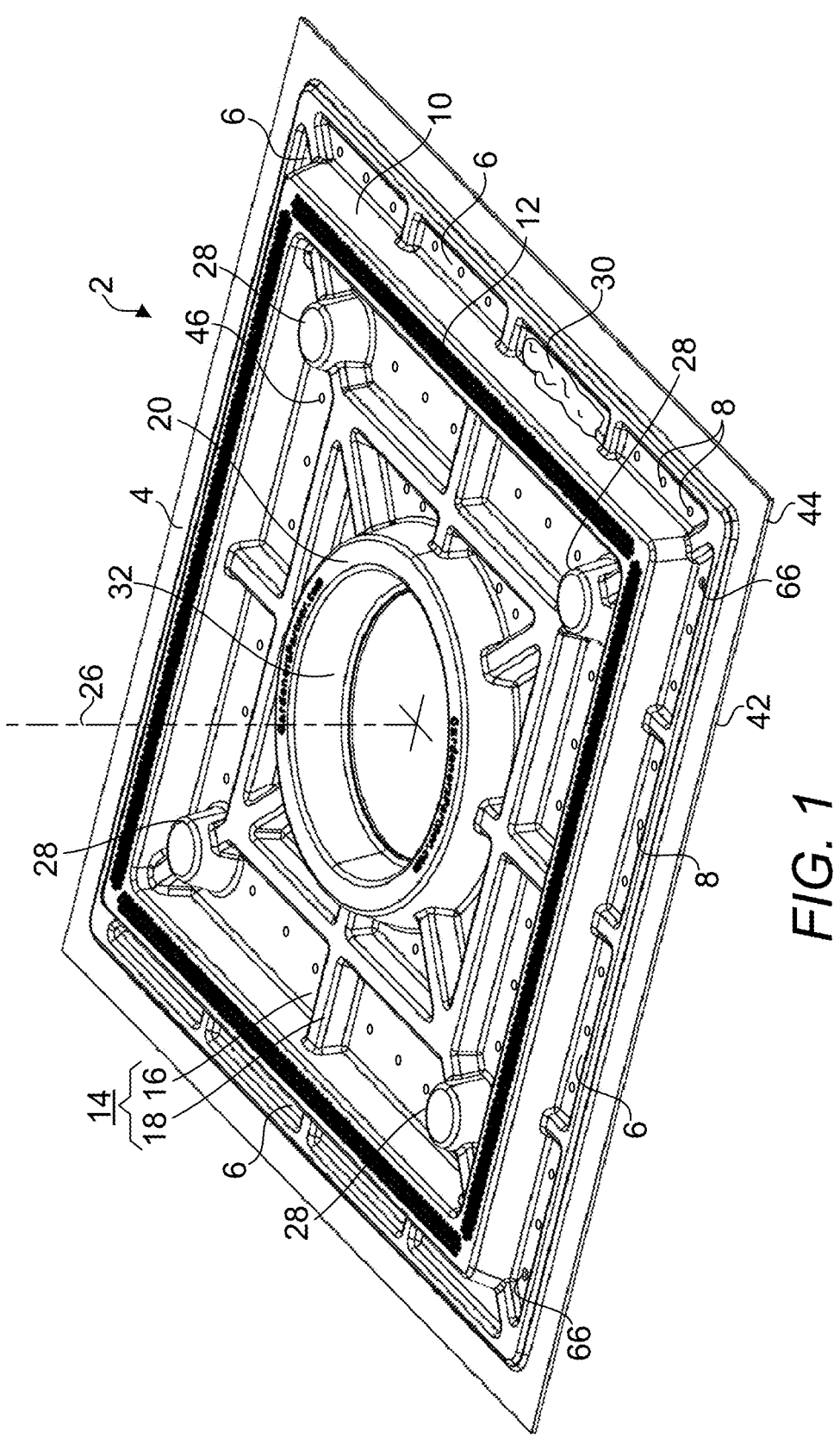
FIG. 1 is a top perspective view of a planter.

2—planter
4—lap edge or plate
6—trough
8—aperture of trough
10—raised structure
12—micro spike
14—section
16—wall of section
18—plate of section
20—levee 22—tube, e.g., transparent tube
26—central axis
28—punch-through hole
30—pest killer, e.g., diatomaceous earth
32—opening
34—width of planter
36—ground
38—plant
40—grass, weed or other ground cover
42—periphery of planter
44—corner of planter
46—aperture or weep hole of plate of section
48—water collected in section/s
50—droplet
52—cover of tube
54—stake
56—eyelet
58—overlapped area
60—slot
62—tab
64—lengthwise edge
66—aperture configured for receiving ground stake or pin
68—height of micro spike
70—spacing between micro spikes
72—height of section wall
74—height of raised structure
76—height of levee
78—width of lap edge
80—channel

PARTICULAR ADVANTAGES OF THE INVENTION

The present planter provides a number of advantages over traditional planting and pest control solutions. Unlike conventional planters or protective barriers, the disclosed low-profile planter incorporates multiple integrated mechanisms specifically designed to deter ground-approaching pests such as slugs and snails. By combining physical and chemical deterrents within a compact and functional structure, the planter ensures enhanced protection for vulnerable plants without reliance on external pest control measures. The present planter supports no-till gardening by enabling protective plant growth without requiring soil disturbance. The centrally-located opening allows the root system of a plant to be placed directly into untilled ground, promoting healthier root development while simplifying installation. The flat lap edges enable easy mowing around the planter, minimizing maintenance concerns and reducing the risk of accidental damage to the planter. The inclusion of a trough surrounding the central opening, designed to hold pest repellents or killers, e.g., diatomaceous earth, creates a primary barrier against crawling pests. The presence of micro-drainage holes in the trough ensures that excess water does not accumulate, maintaining the effectiveness of the pest control material. A secondary defense is provided by a slightly-raised peripheral portion adjacent to the trough, which is covered with micro spikes to physically deter pests if the chemical repellent loses effectiveness. This dual-layered defense system significantly increases the reliability of pest protection. Further, the short walls and levees around the central opening help to retain water within designated sections, particularly beneficial when the planter is placed on a slope. Integrated weep holes provide a passive, slow-release watering mechanism, supporting plant hydration without over-saturation. Additional functional features include the ability to place pea gravel on top surfaces, offering thermal mass benefits that moderate temperature fluctuations and anchor the planter against wind or disturbance. Punch-through holes around the central opening allow for easy installation of trellises for climbing or vine plants, such as tomatoes. Other peripheral holes accommodate ground stakes to further secure the planter in place. Additionally, the rectangular configuration of the planter facilitates seamless, continuous ground coverage by aligning multiple units together, making it suitable for large-scale planting arrangements while maintaining protection and order.

Collectively, these features offer a robust, scalable, and low-maintenance solution for pest deterrence, moisture management, and plant support, making the present planter particularly advantageous for both residential and commercial gardening applications.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
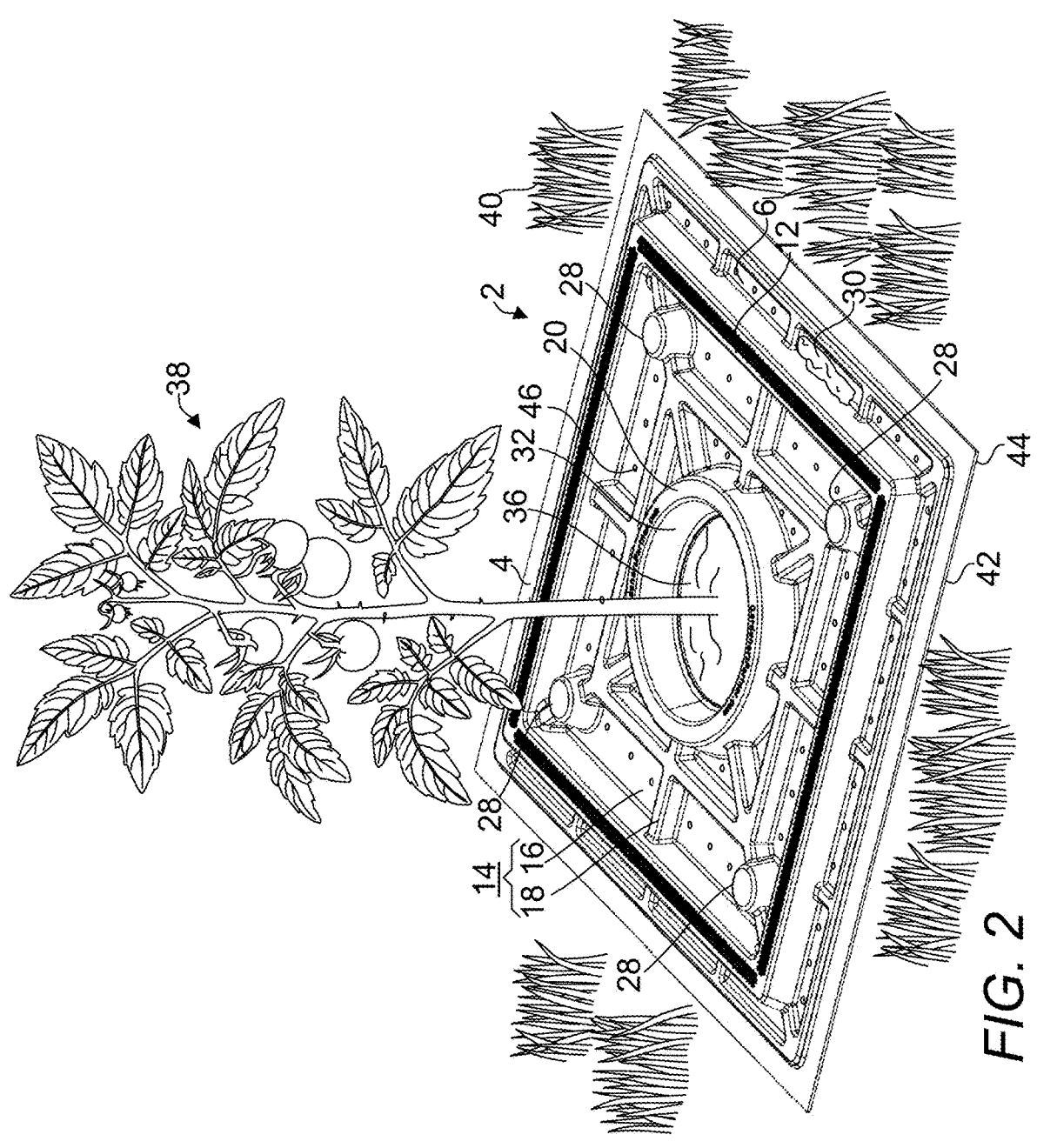
FIG. 2 is a top perspective view of the planter of FIG. 1, configured to surround and protect a plant.
Figure 3:
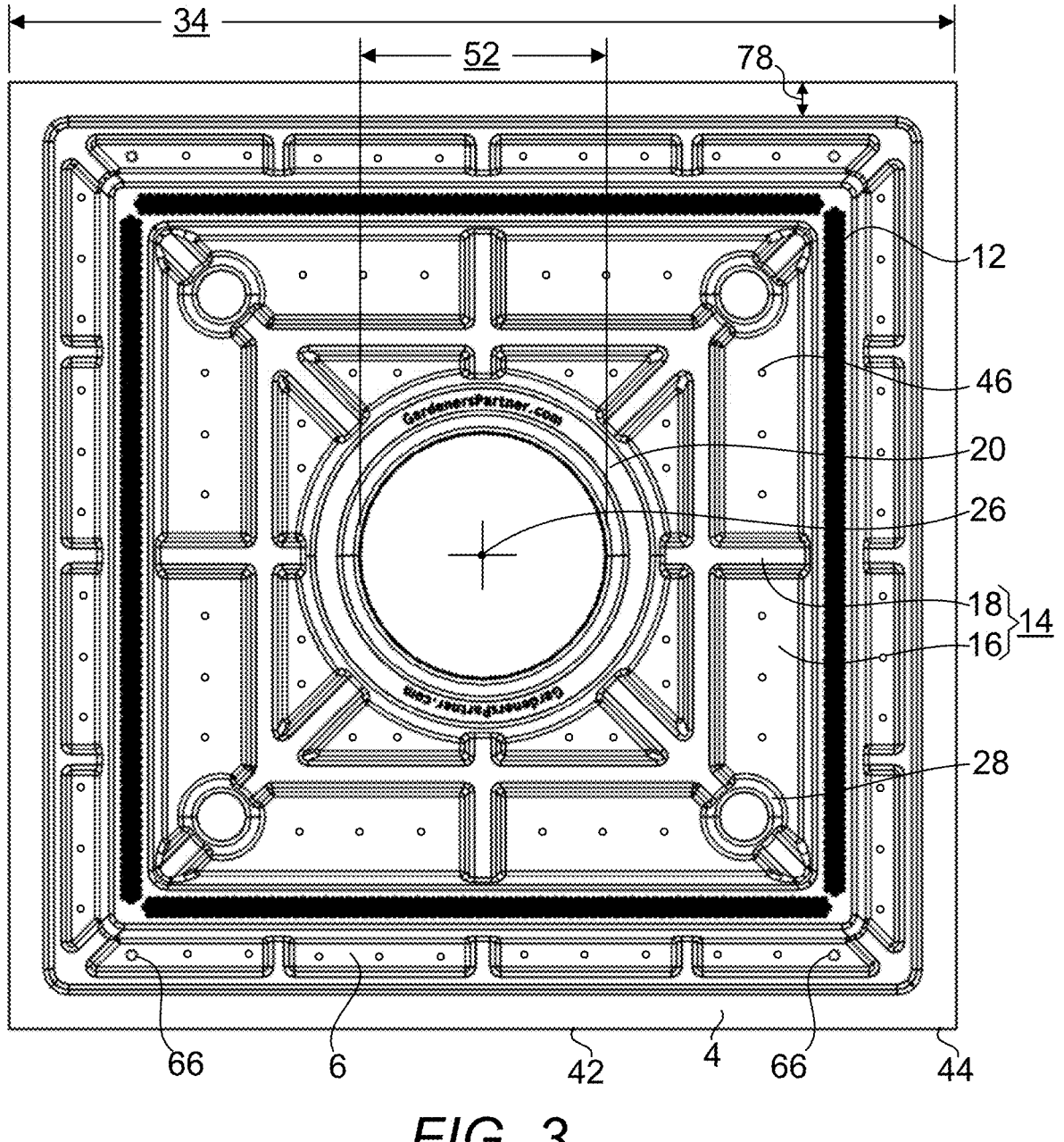
FIG. 3 is a top view of the planter of FIG. 1.
Figure 4:
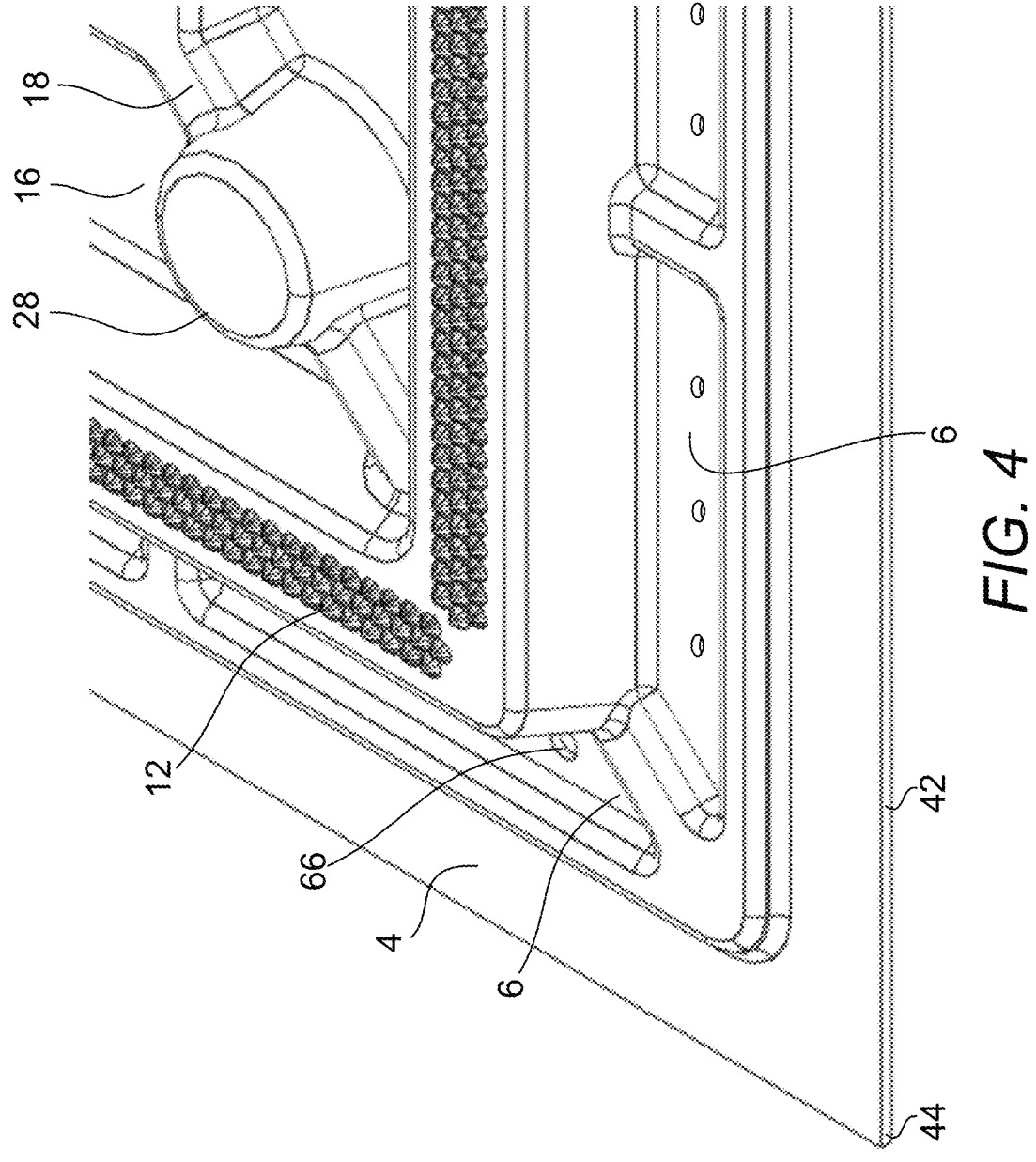
FIG. 4 is a partial top perspective view of the planter of FIG. 1, depicting details of a plurality of micro spikes.
Figure 5:
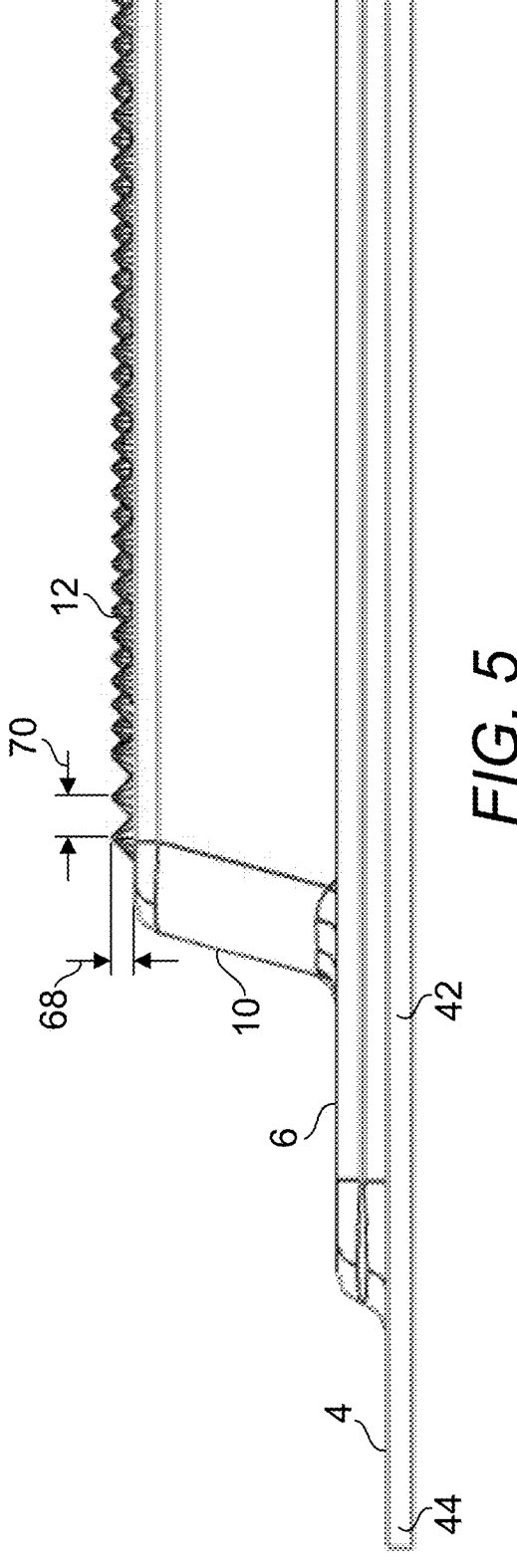
FIG. 5 is a partial side view of the planter of FIG. 1, depicting details of a plurality of micro spikes.

FIG. 1 is a top perspective view of a planter 2. FIG. 2 is a top perspective view of the planter 2 of FIG. 1, configured to surround and protect a plant. FIG. 3 is a top view of the planter 2 of FIG. 1. FIG. 4 is a partial top perspective view of the planter 2 of FIG. 1, depicting details of a plurality of micro spikes 12. FIG. 5 is a partial side view of the planter of FIG. 1, depicting details of a plurality of micro spikes 12. As shown in FIGS. 1 and 2, planter 2 includes a generally rectangular cover formed with a periphery 42 and a central opening 32 through which the plant 38 extends. A trough 6 is disposed at a first offset from the periphery 42 and configured to receive a pest repellent 30, e.g., diatomaceous earth. Apertures 8 in the trough 6 may aid in draining excess water, thereby helping to prolong the effective life of the pest killer contained within. Adjacent to and inward from trough 6, a band of micro spikes 12 is disposed at a second offset from the periphery 42, greater than the first offset, and cooperates with pest killer 30 to prevent crawling pests from reaching the central opening 32 as shown in FIGS. 4 and 5. In use, if a pest successfully circumvents the pest killer 30, or if none is present in the trough, the band of micro spikes 12 which includes 3 to 4 rows of micro spikes adjacent to the trough 6, serves as an additional line of defense against snails or slugs advancing toward the plant rooted through the opening 32. The central axis 26 indicates the preferred location for positioning a plant. As used herein, micro spikes refer to microstructures each having a broader base that tapers to a peak, with the peaks spaced apart a distance 68 of about ⅛ to ¼ inches and the structures having a uniform height 70 of about ⅛ to about ¼ inches. Applicant has discovered that a lap edge 4 having a width 78 of about 0.25 to about 3 inches provides sufficient clearance to facilitate mowing around the planter.

Figure 7:
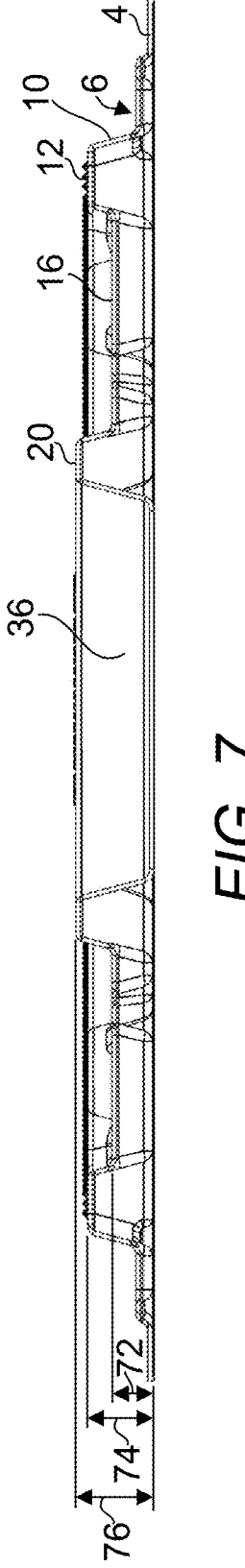
FIG. 7 is a side cross-sectional view of the planter of FIG. 1, illustrating construction details formed by molding.

A levee 20 may be disposed adjacent to the opening 32, forming a boundary that works in conjunction with a raised structure 10 to trap and retain water between them. Without a levee 20, excess rainwater or irrigation water can flood the opening, causing a relatively small area of the opening 32 to receive runoffs from other parts of the planter and flooding the plant. Referring to FIG. 7, it is noted that the levee 20 extends above the height of other portions of the planter, particularly raised structure 10, thereby preventing potential flooding.

Figure 9:
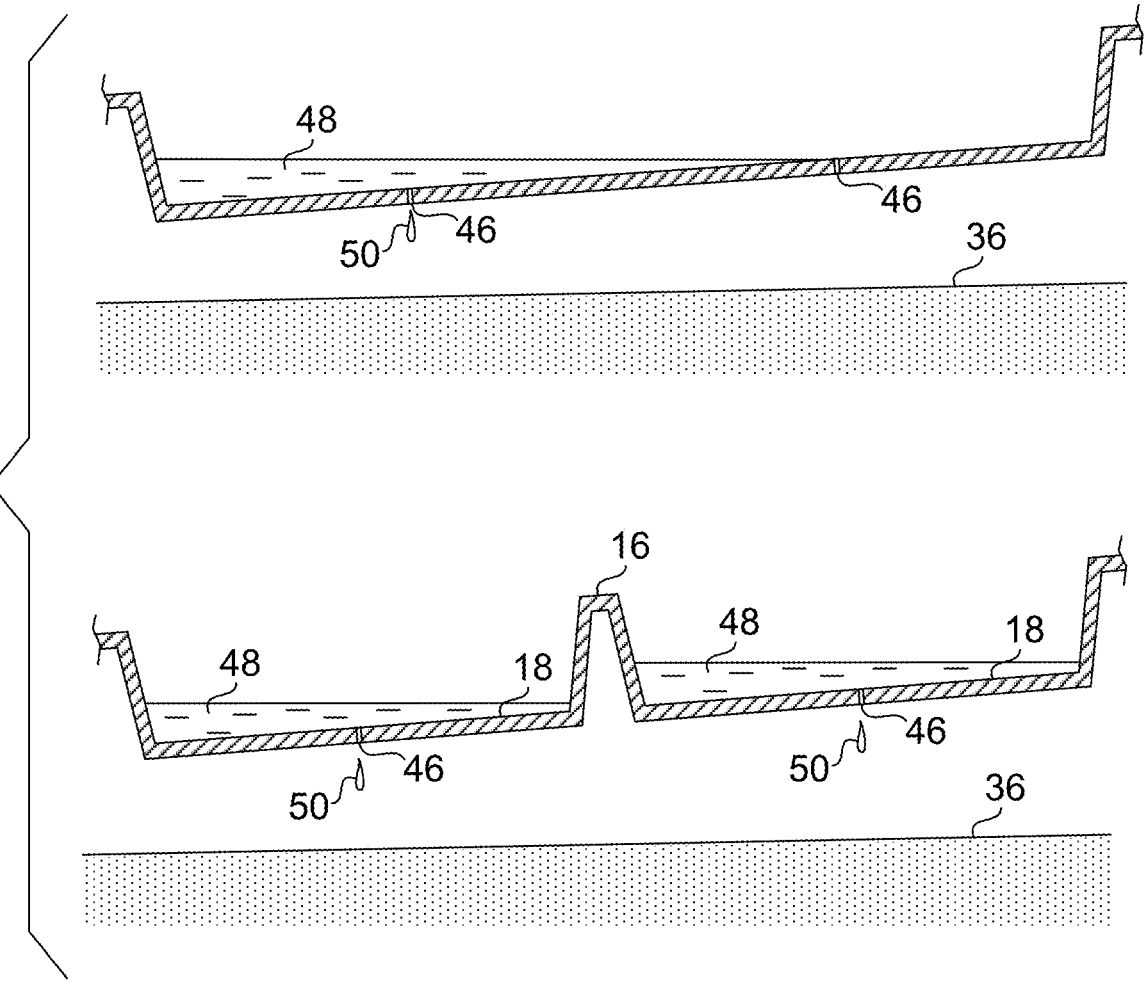
FIG. 9 is a diagram contrasting the benefits of utilizing sections to control the release of collected water, as compared to a surface lacking such sections.

A plurality of sections 14 are disposed between the band of micro spikes 12 and the central opening 32, each section being defined by walls 16, a portion of the levee 20 or a portion of a raised structure 10, enclosing a plate 18. Each plate 18 includes a plurality of apertures or weep holes 46 that allow water to drain, helping to retain moisture in controlled volumes, e.g., water 48 collected in the section or droplets 50 that continue to drip slowly as shown in FIG. 9. The micro spikes 12 are formed atop a raised structure 10, elevating them slightly to enhance their effectiveness as a barrier while the raised structure 10 also serves as the outer perimeter of the sections 14 to contain water, e.g., irrigation water and rainwater, etc.

In some embodiments, punch-through holes 28 are disposed within the area enclosed by the band of micro spikes 12. Each punch-through hole 28 may be selectively formed by the user by removing or puncturing a cover that is integrally connected to the planter by a thin or perforated substrate formed during the molding process. The planter may be provided to the user with the covers intact, allowing the user to manually open the holes as needed. Alternatively, the planter may be provided with the punch-through holes already opened to accommodate the use of a trellis or similar structure. A flat plate or lap edge 4 extends from the trough 6 to the periphery 42 to tamp down grass at the edge of the planter, provide structural support, offer additional surface area to help distance yard equipment from the plant rooted through the opening 32 at its base, and enable easy mowing around the planter to minimize maintenance and reduce the risk of accidental damage. In one embodiment, the width of the lap edge 4 is about 0.25 to about 3 inches. Applicant discovered that a width 34 of the planter of about 10 to about 34 inches provides sufficient buffer between a plant 38 rooted in the centrally-located opening 32 and the planter's periphery 42 to allow the roots of the plant to proliferate within an area covered by the planter and any grass and/or weeds 40 covered would not continue to thrive and compete in nutrients with the plant. In one embodiment, the opening 32 measures about 4 to about 8 inches in diameter. No tilling of the ground is necessary to accommodate plant 38, as the opaque cover blocks sunlight, causing any grass or weeds beneath the planter to wither over time and decompose into compost, thereby nourishing the plant.

A ground stake (not shown) may be inserted through an aperture 66 located at a corner 44 of the rectangular cover and driven into the ground 36 to secure the planter 2 to the ground 36 against wind or to ensure it rests more firmly on the ground. In one embodiment not shown, the ground 36 around the plant is first covered using a weed barrier sheet or fabric before the planter 2 is disposed over the weed barrier sheet to reduce weed growth around the plant within the opening 32.

Figure 6:
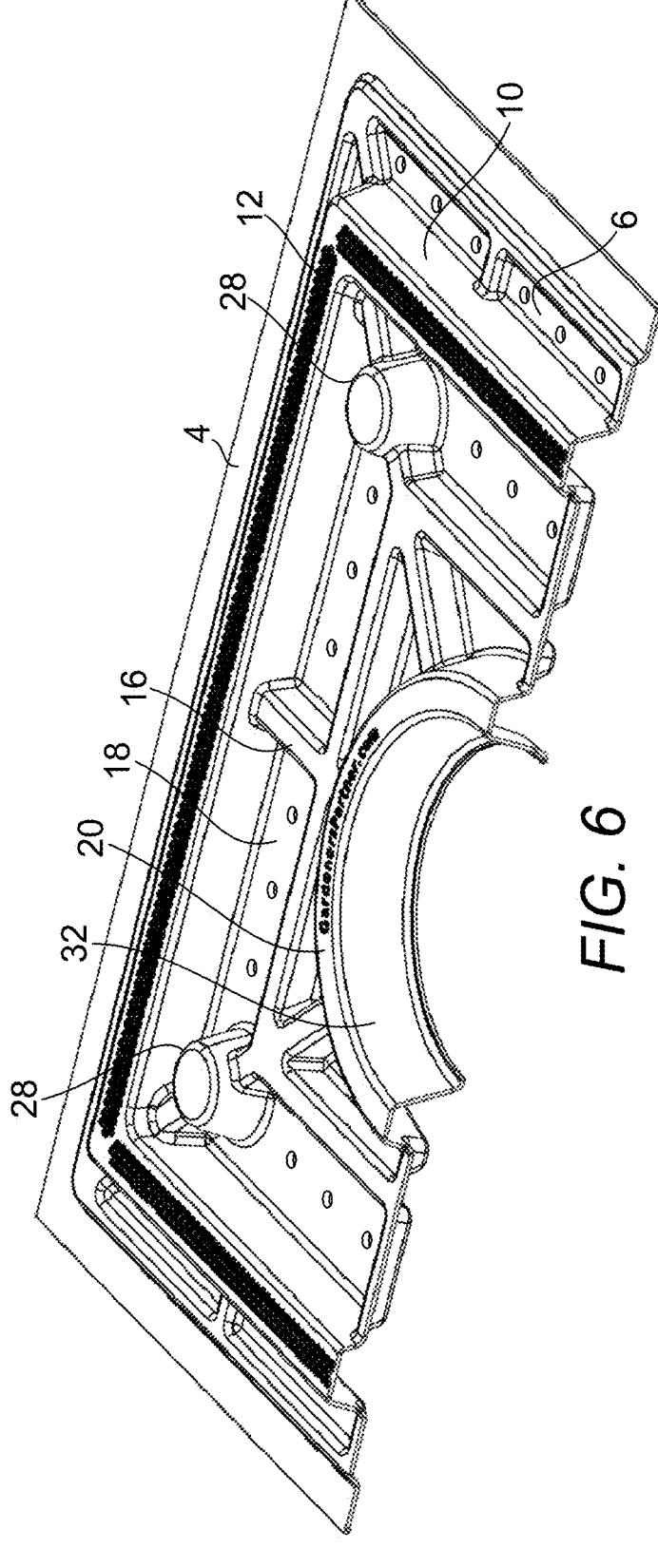
FIG. 6 is a partial top perspective cross-sectional view of the planter of FIG. 1, illustrating construction details formed by molding.

FIG. 6 is a partial top perspective cross-sectional view of the planter of FIG. 1, illustrating construction details formed by molding with, e.g., a durable plastic, e.g., Acrylonitrile Butadiene Styrene (ABS), High-Density Polyethylene (HDPE), and Polyvinyl Chloride (PVC), etc. FIG. 7 is a side cross-sectional view of the planter of FIG. 1, illustrating construction details formed by molding. The planter 2 may be molded as a unitary body as shown in FIGS. 6 and 7, with details shaped to accommodate pest deterrence and plant protection without requiring additional parts to perform its basic functions. In some circumstances, ground stakes (not shown) are used to further secure the planter to the ground through apertures 66, pea gravel (not shown) is disposed in the sections for weighing down the planter and to enhance heat retention for the plant disposed rooted in the opening. In other circumstances, a trellis (not shown) may also be used to support viny plants, e.g., tomato plants.

Figure 8:
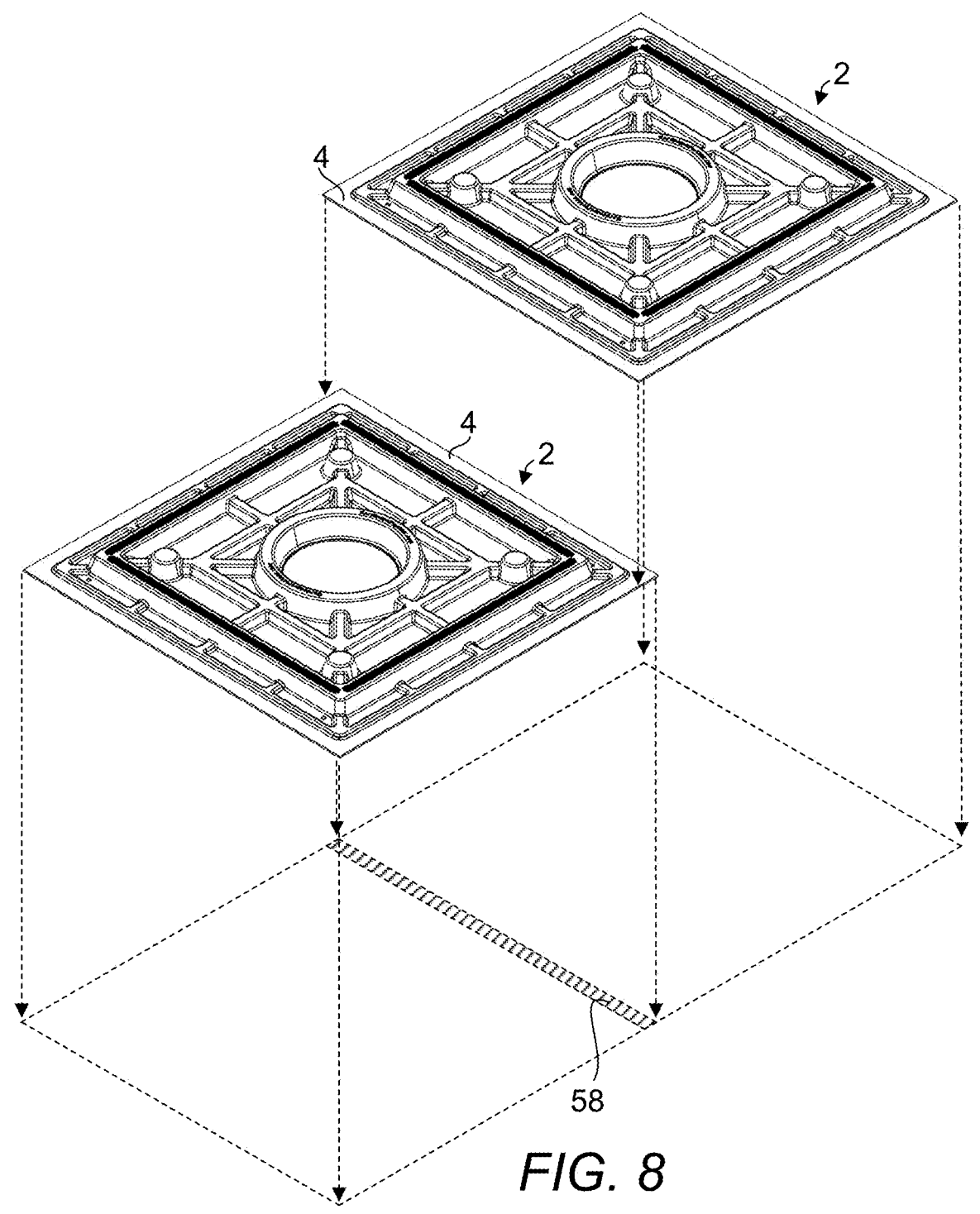
FIG. 8 is a diagram depicting a manner in which two planters may be arranged with overlapping edges to form a continuous series of planters.

FIG. 8 is a diagram depicting a manner in which two planters may be arranged with overlapping edges to form a continuous series of planters. Two or more planters 2 can be arranged in adjacent fashion, with an overlapped area 58 created by overlapping a portion of the lap edge 4 of one planter and a portion of the lap edge 4 of another planter, forming a continuous protective cover for linear planting beds or rows of crops. The overlapping portions of the lap edges 4 limit sunlight penetration into the overlapped area 58, thereby minimizing unwanted growth of grass and/or weeds between adjacent planters.

FIG. 9 is a diagram contrasting the effects of using sections to control the release of collected water, compared to a surface lacking such sections. The upper drawing illustrates a water collector without sections, while the lower drawing depicts a similarly-sized water collector divided into two sections. Each section includes at least one centrally-disposed aperture 46. Assuming identical water collection conditions and placement on an equivalent grade, it can be observed that irrigation via droplet 50 flow through apertures 46 beneath the collectors differs significantly. The undivided collector shown in the upper drawing fails to distribute water evenly due to the absence of discrete sections, whereas the sectioned collector in the lower drawing allows each section to retain and release sufficient water for more uniform irrigation beneath the planter. It will be appreciated that a planter having a sectioned surface promotes balanced hydration around the plant's root zone while helping to prevent oversaturation. As all section walls 16 are disposed at the same height 72, a sudden collection of water, e.g., due to heavy rainfall, will cause excessive water to overflow the walls 16 from one section to another. If all sections have been filled, the water level may continue to rise until it overflows the raised structure 10, which is positioned away from the opening 32, as the height 74 of the raised structure 10 is configured to be lower than the height 76 of the levee 20. In this way, the plant will not be flooded, as the now-filled sections will continue to slow-drip water beneath the planter but away from the base of the plant.

Figure 10:
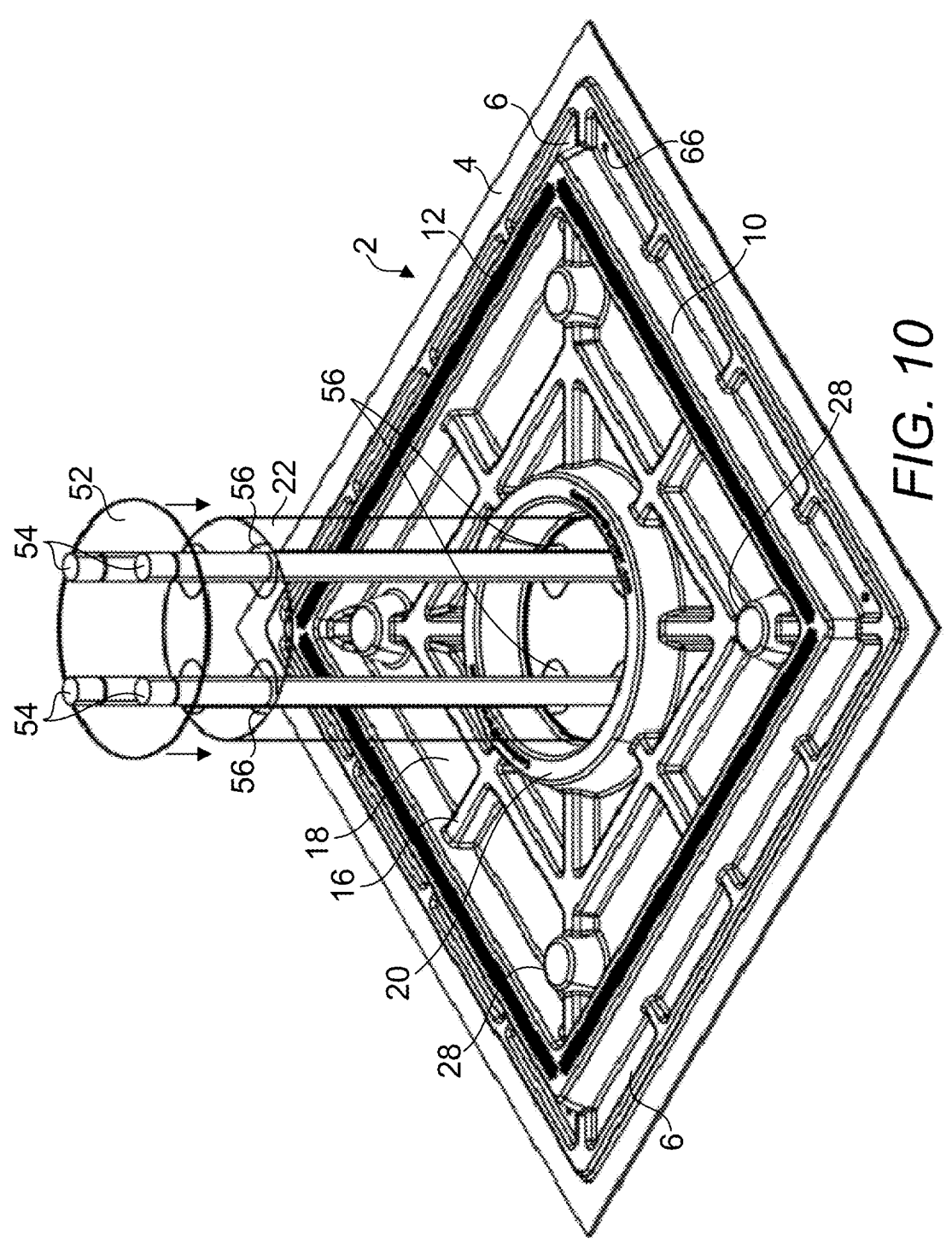
FIG. 10 is a top perspective view of a planter with a tube configured to protect a tender seedling from environmental stress during its initial growth phase.
Figure 11:
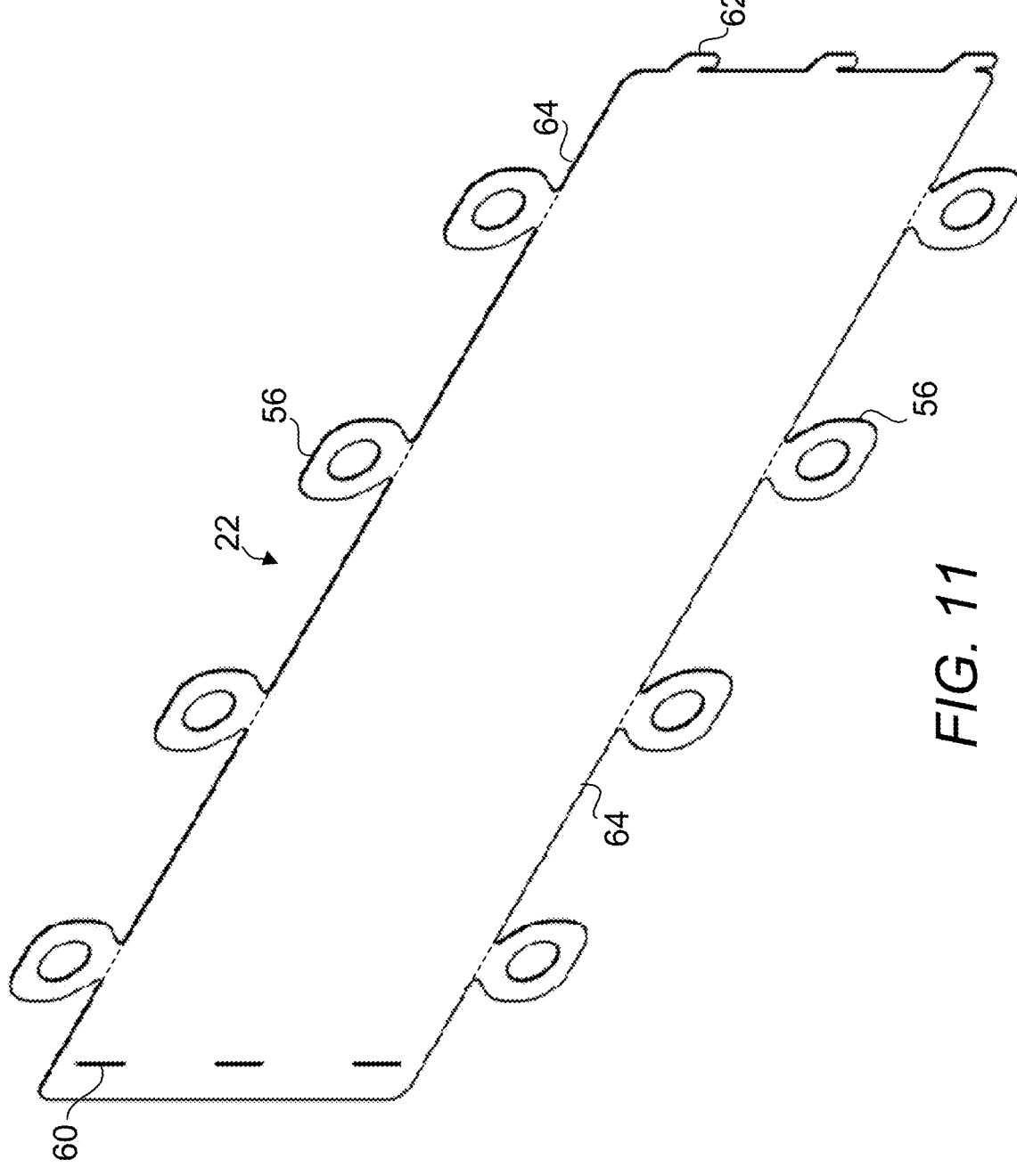
FIG. 11 is a front perspective view of a sheet configured for assembly into a tube.

FIG. 10 is a top perspective view of a planter with a tube 34, e.g., a transparent tube, configured to protect a tender seedling from environmental stress during its initial growth phase. FIG. 11 is a front perspective view of a sheet configured for assembly into a tube. In certain embodiments, the tube 22 is positioned within the central opening 32 to shield a tender seedling from wind, pests, or other environmental stress. A cover or lid 52 may be placed atop the tube 22 to enclose it, forming a mini greenhouse effect to promote growth. As shown in FIG. 11, the tube 22 may be assembled from a sheet 34 having two side edges configured to be coupled together, forming a transparent cylinder that allows sunlight penetration while offering physical protection. One of the two edges includes tabs 62 while the other one of the two edges includes matching slots 60 within which the tabs 62 are coupled. In the embodiment shown, eyelets 56 are configured to protrude from each lengthwise edge 64. The ability to ship the tube 22 in the form of a flat sheet facilitates more efficient shipping and storage. Upon forming a tube from a flat sheet, the eyelets 56 may be bent inwardly at a right angle to allow the eyelets 56 disposed on the upper edge 34 to be aligned with those disposed on the lower edge

34 such that stakes 54 may be used to further secure the tube 22 within the opening 32. In one embodiment not shown, the tube may be substituted with an opaque tube to block direct sunlight from reaching the plant, thereby mitigating overheating within the interior of the tube.

Figure 12:
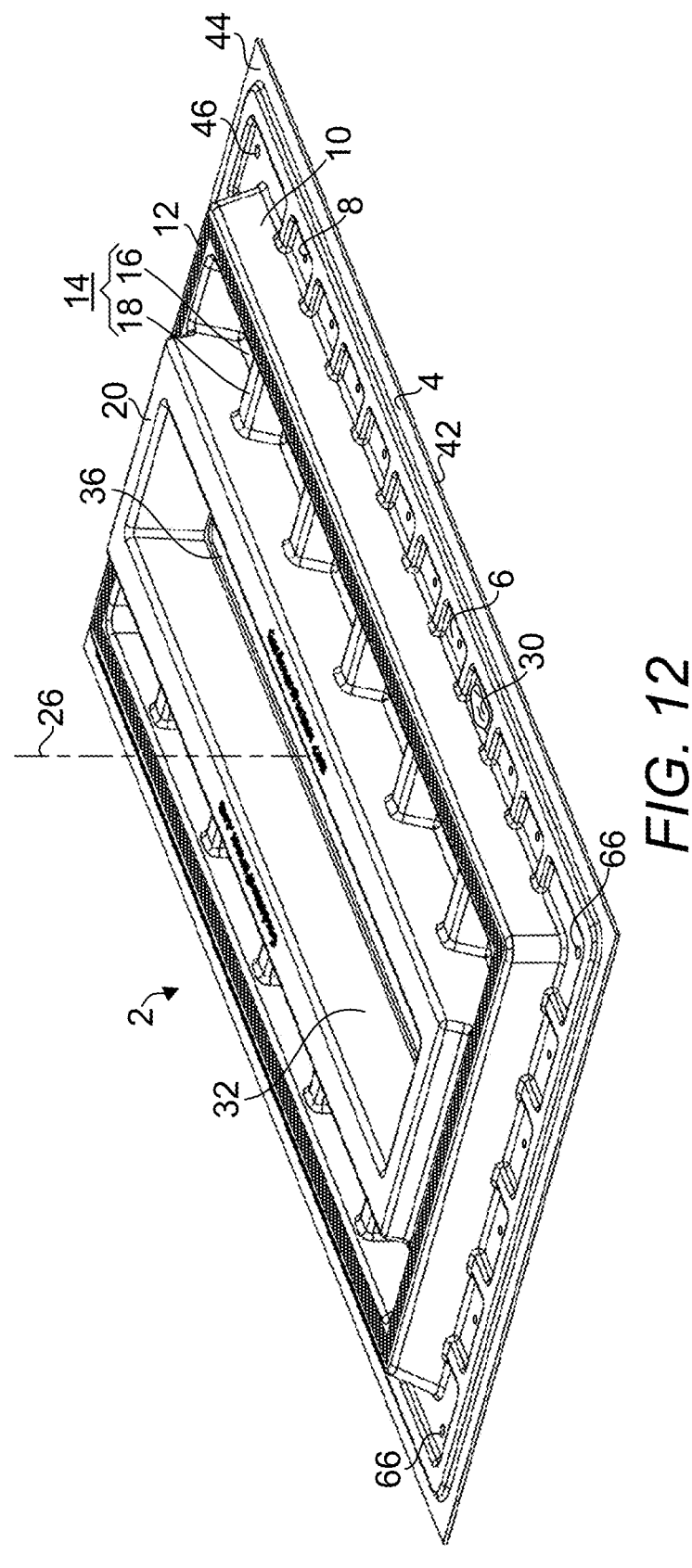
FIG. 12 is a top perspective view of another embodiment of a planter.
Figure 13:
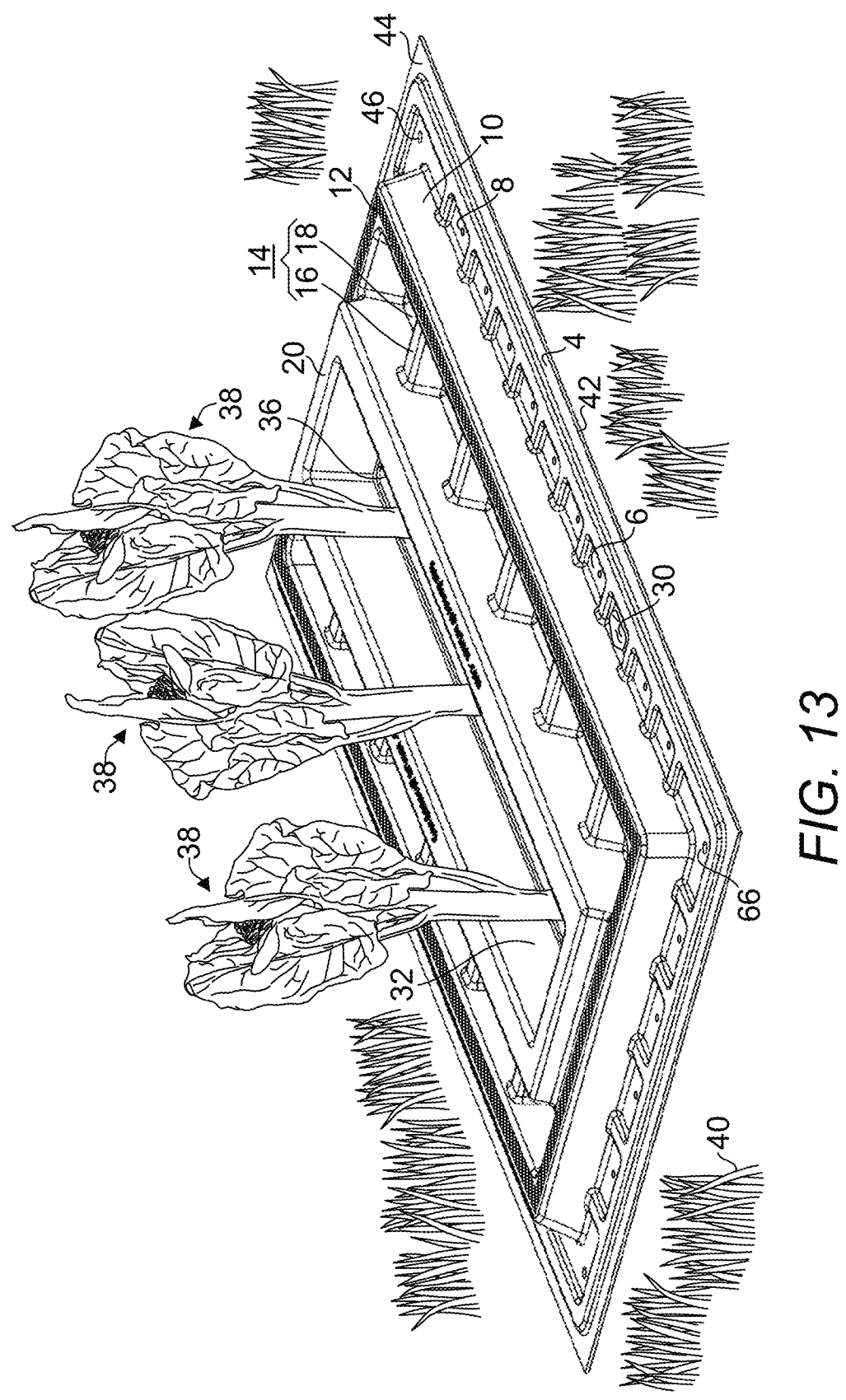
FIG. 13 is a top perspective view of the planter of FIG. 12, configured to surround and protect one or more plants.

FIG. 12 is a top perspective view of another embodiment of a planter. FIG. 13 is a top perspective view of the planter of FIG. 12, configured to surround and protect one or more plants 38. FIGS. 12 and 13, depicting a variation of planter 2 with a similar arrangement of structural features configured to surround and protect plant 38, but differing in overall shape as it is elongated to accommodate an elongated opening 32 to surround a plurality of plants 38, e.g., onions, carrots, lettuce, peas, cauliflower, and cabbage, etc., without requiring a plurality of planters 2 disclosed elsewhere herein.

Figure 14:
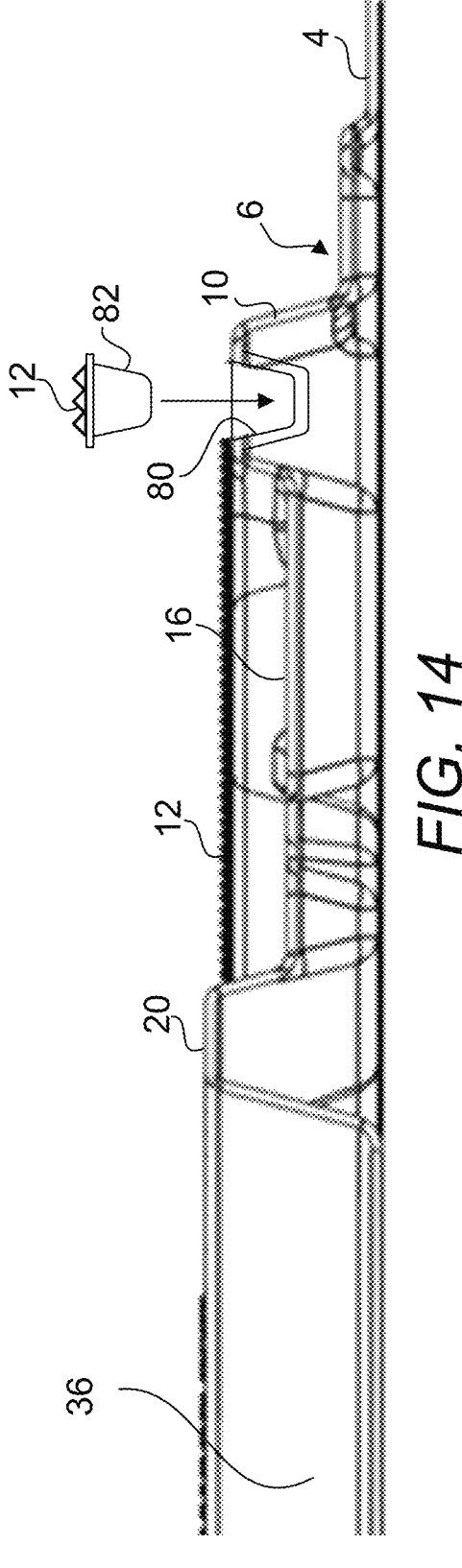
FIG. 14 is a partial side cross-sectional view of yet another embodiment of a planter, illustrating construction details formed by molding.

FIG. 14 is a partial side cross-sectional view of yet another embodiment of the planter, illustrating construction details formed by molding. In this embodiment, the micro-spikes 12 are provided as a removable and replaceable component of the planter 2. A channel 80 is formed on an upper surface of the raised structure 10, the channel 80 being adapted to receive one or more bands of micro-spikes 12. Each band includes an insert 82 extending from its bottom surface, configured to seat snugly within at least a portion of the channel 80. In this manner, the planter may be selectively configured with various defense mechanisms suited to repel different types of pests. For example, if rabbit deterrence is also desired, the channel 80 may be used to receive bands equipped with structures adapted to repel rabbits, such as larger spikes or a miniature fence.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A planter for surrounding the base of one or more plants rooted in the ground, said planter comprising:

(a) a rectangular cover comprising a periphery and an opening through which the one or more plants are disposed;

(b) a trough disposed at a first offset from said periphery, wherein said trough is configured for receiving a pest repellent;

(c) a raised structure disposed at a second offset from said periphery, wherein said second offset is larger than said first offset and said raised structure is disposed adjacent to said trough and configured to cooperate with at least one section, the at least one section configured to contain moisture received in an area between said raised structure and a levee surrounding said opening, said levee configured to extend above the height of said raised structure; and (d) wherein each at least one section comprises a plate surrounded by walls and a plurality of weep holes disposed through said plate.

2. The planter according to claim 1, wherein the plate is a flat plate extending from said trough to said periphery.

3. The planter according to claim 1, wherein the at least one section comprises a plurality of sections extending from said raised structure to said opening.

4. The planter according to claim 1, further comprising a plurality of apertures each disposed at a corner of said rectangular cover and configured to receive a pin to secure said rectangular cover to the ground.

5. The planter according to claim 1, further comprising a plurality of punch-through holes within an area of said rectangular cover between said raised structure and said opening.

6. The planter according to claim 1, further comprising a tube configured to be disposed within said opening and a transparent lid configured to be disposed atop said tube.

7. The planter according to claim 6, wherein said tube is formed of a flat sheet having two side edges, said flat sheet configured to be manipulatable into the shape of a cylinder by coupling said two side edges together.

8. A planter for surrounding the base of one or more plants rooted in the ground, said planter comprising:

(a) a rectangular cover comprising a periphery, an opening through which the one or more plants are disposed and a flat plate disposed in a direction from said opening to said periphery, wherein said flat plate comprises a width of about 0.25 to about 3 inches; and (b) a levee disposed about said opening to prevent water received on said rectangular cover to roll off into said opening by gravity, said levee configured to extend above the height of a raised structure of said rectangular cover proximate to said periphery, said raised structure disposed adjacent to at least one section and a trough; and (c) said at least one section configured to cooperate with said raised structure to contain moisture received in an area between said raised structure and said levee surrounding said opening, wherein each said at least one section comprises a plate surrounded by walls and a plurality of weep holes disposed through said plate.

9. The planter according to claim 8, further comprising a trough disposed at a first offset from said periphery, wherein said trough is configured for receiving a pest repellent.

10. The planter according to claim 9, wherein the raised structure is disposed at a second offset from said periphery, wherein said second offset is larger than said first offset.

11. A planter for surrounding the base of one or more plants rooted in the ground, said planter comprising:

(a) a rectangular cover comprising a periphery, an opening through which the one or more plants are disposed and a flat plate disposed in a direction from said opening to said periphery, wherein said flat plate comprises a width of about 0.25 to about 3 inches; and (b) a plurality of sections disposed between said periphery and said opening, wherein each of said plurality of sections comprises a plate surrounded by walls and a plurality of weep holes disposed through said plate; and (c) a raised structure and a levee disposed about said opening, said levee configured to extend above the height of said raised structure.

12. The planter according to claim 11, further comprising a trough disposed at a first offset from said periphery between said periphery and said plurality of sections, wherein said trough is configured for receiving a pest repellent.

13. The planter according to claim 12, further comprising said raised structure disposed at a second offset from said periphery, wherein said second offset is larger than said first offset and said raised structure is configured to cooperate with said plurality of sections to contain moisture received in an area between said raised structure and said opening.

* * * * *